(12) United States Patent
Liu et al.

(10) Patent No.: US 11,358,189 B2
(45) Date of Patent: Jun. 14, 2022

(54) SITE HEAVY METAL CONTAMINATED SOIL TREATMENT EQUIPMENT AND TREATMENT METHOD THEREFOR

(71) Applicant: GUANGDONG INSTITUTE OF ECO-ENVIRONMENTAL SCIENCE & TECHNOLOGY, Guangzhou (CN)

(72) Inventors: Chengshuai Liu, Guangzhou (CN); Yahui Lv, Guangzhou (CN); Wei Wu, Guangzhou (CN); Fei Wu, Guangzhou (CN); Fangbai Li, Guangzhou (CN)

(73) Assignee: Guangdong Institute of Eco-Environmental Science & Technology

(*) Notice: Subject to any disclaimer, the term of this patent is extended or adjusted under 35 U.S.C. 154(b) by 0 days.

(21) Appl. No.: 17/044,388

(22) PCT Filed: Jan. 8, 2019

(86) PCT No.: PCT/CN2019/070786
§ 371 (c)(1),
(2) Date: Oct. 1, 2020

(87) PCT Pub. No.: WO2019/192241
PCT Pub. Date: Oct. 10, 2019

(65) Prior Publication Data
US 2021/0101193 A1    Apr. 8, 2021

(30) Foreign Application Priority Data
Apr. 2, 2018 (CN) .......................... 201810283154.4

(51) Int. Cl.
*B09C 1/08* (2006.01)
*B09C 1/06* (2006.01)
(Continued)

(52) U.S. Cl.
CPC ............... *B09C 1/08* (2013.01); *B09C 1/06* (2013.01); *B09C 2101/00* (2013.01);
(Continued)

(58) Field of Classification Search
CPC ......... B09C 1/08; B09C 1/06; B09C 2101/00; B28B 11/14; B28B 15/002; B28C 5/165; B09B 3/00; B09B 3/0083
See application file for complete search history.

(56) References Cited

U.S. PATENT DOCUMENTS

| | | | | |
|---|---|---|---|---|
| 5,236,282 A * | 8/1993 | Teasel | .................. | B09C 1/08 |
| | | | | 405/128.7 |
| 5,340,396 A * | 8/1994 | Meegoda | .............. | E01C 19/104 |
| | | | | 106/669 |
| 5,863,476 A * | 1/1999 | Wier | ..................... | B09C 1/00 |
| | | | | 264/72 |
| 2012/0082839 A1* | 4/2012 | Ha | ..................... | C04B 14/28 |
| | | | | 428/221 |

FOREIGN PATENT DOCUMENTS

| | | |
|---|---|---|
| BR | PI1002992 A2 | 2/2013 |
| CN | 104197702 A | 12/2014 |

(Continued)

*Primary Examiner* — Carib A Oquendo
(74) *Attorney, Agent, or Firm* — The Webb Law Firm (57) ABSTRACT

An on-site heavy metal contaminated soil treatment apparatus, comprising a sampling system, a molding system, a heat processing system and a tail gas processing system disposed in sequence. The sampling system includes a bucket elevator and a planetary stirring device which are connected in sequence and are disposed on a mobile platform of the sampling system. The apparatus is easy to move and assemble, has a small floor area, and can be built on a target contaminated site, reducing transportation costs and the risk of secondary contamination. The entire process performed by the apparatus proceeds automatically, reducing labor costs. The planetary stirring sampling method and automatic brick blank extrusion molding process of the apparatus are applicable to various types of heavy metal contaminated soil providing high processing efficiency and (Continued)

good molding effect. Combined microwave heating and high-temperature steam heating provide rapid heating, small thermal inertia, and easy temperature control.

10 Claims, 7 Drawing Sheets

(51) Int. Cl.
*B28B 11/14* (2006.01)
*B28B 15/00* (2006.01)
*B28C 5/16* (2006.01)

(52) U.S. Cl.
CPC ............. *B28B 11/14* (2013.01); *B28B 15/002* (2013.01); *B28C 5/165* (2013.01)

(56) References Cited

FOREIGN PATENT DOCUMENTS

| | | | |
|---|---|---|---|
| CN | 105256122 A | 1/2016 | |
| CN | 205760439 U | 12/2016 | |
| CN | 206334485 U | 7/2017 | |
| CN | 107262493 A | 10/2017 | |
| CN | 107497842 A | 12/2017 | |
| CN | 206853565 U | 1/2018 | |
| CN | 207086557 U | 3/2018 | |
| CN | 108453122 A | 8/2018 | |
| CN | 208261514 U | 12/2018 | |
| DE | 3804826 A1 * | 8/1989 | ................ E02F 5/00 |
| TW | 236580 | 12/1994 | |

* cited by examiner

SITE HEAVY METAL CONTAMINATED SOIL TREATMENT EQUIPMENT AND TREATMENT METHOD THEREFOR

CROSS-REFERENCE TO RELATED APPLICATIONS

This application is the United States national phase of International Application No. PCT/CN2019/070786 filed Jan. 8, 2019, and claims priority to Chinese Patent Application No. 201810283154.4 filed Apr. 2, 2018, the disclosures of each of which are hereby incorporated by reference in their entirety.

FIELD OF THE INVENTION

The present invention relates to the field of hazardous solid waste treatment, in particular to a site heavy metal contaminated soil treatment equipment and a treatment method therefor.

BACKGROUND OF THE INVENTION

In recent years, with the adjustment of industrial structure and the development of cities in China, polluting enterprises are facing relocation or closure. Due to the obsolete equipment of the enterprise, the imperfect discharge technology and management methods of industrial "three wastes", some toxic and harmful heavy metal pollutants have entered the foundation soil and groundwater, causing the original site of the enterprise to become an industrial contamination site. For example, in the economically developed Pearl River Delta region where there were many factories of hardware, chemical, iron and steel and the like, the soil has been seriously contaminated by heavy metals, which seriously affects the local ecological environment, threatens people's health, and restricts economic development. Therefore, the remediation of site heavy metal contaminated soil has become a major issue affecting people's lives, urban planning, and sustainable development.

At present, heavy metal contamination control technologies can be divided into physical remediation technology such as cement immobilization and plastic material containment, chemical remediation technology such as pharmaceutical stabilization, bioremediation technology such as plant extraction and microbial remediation, and so on. Because heavy metal contamination in industrial plants shows the characteristics of point contamination, i.e., there are contaminated and uncontaminated situations in different locations in the same plant, the degree of contamination of contaminated soil is also different. At the same time, considering the economic factors such as the secondary development and utilization of land, it is required that the soil remediation cycle should not be too long. However, the drip washing remediation technology will produce a large amount of waste liquid, which will cause serious secondary contamination if not treated properly; the remediation depth of plant extraction is only in the rhizosphere range, and the remediation cycle thereof is long, usually requiring more than five years of remediation time; and microbial remediation has higher requirements on soil conditions, is restricted by environmental factors, and has a narrow application range. Therefore, the remediation cycle and effects of drip washing, plant extraction, microbial remediation and other methods are difficult to meet the current requirements of site heavy metal contaminated soil remediation.

The immobilization/stabilization technologies immobilize heavy metals and prevent their migration and diffusion in the environment mainly by changing the existing form of heavy metals in the soil, thereby reducing the poisoning degree of heavy metals. Compared with other remediation methods, the immobilization/stabilization technologies are widely used in the treatment of heavy metal contaminated sites due to their low costs, convenient construction, short remediation time, and long-term environmental safety. Among them, the high-temperature immobilization treatment has become a more common immobilization/stabilization method in recent years, such as cement rotary kiln treatment and bricking treatment. The technology, using heavy metal contaminated soil as part of raw materials for high-temperature burning to make cement or bricks, can not only immobilize heavy metals into a stable mineral structure and eliminate the risk of heavy metal leakage, but also allow the converted products to be used as roadbed or building materials, thereby achieving harmless and recycling treatment of contaminated soil.

Due to the limitation of sites, the traditional high-temperature immobilization treatment technology needs to transport heavy metal contaminated soil to a fixed site for remediation, which has high transportation cost and may cause contamination along the way and site contamination; the process is tedious, and the automation degree of equipment is low, increasing the labor cost; the brick compressing and molding process is not perfect, the brick molding effect is poor, and the scrap rate is high; the traditional furnace is not uniformly heated, and cannot achieve precise temperature control, easy to cause under-fire or over-fire to affect the quality of bricks; the heating efficiency is low, and the energy consumption is large; tail gas pollutants are inadequately controlled, especially when contaminated soil is used as raw materials, a large amount of volatile organic matter and heavy metal pollutants will be produced and cannot be completely removed, which may cause serious secondary contamination.

SUMMARY OF THE INVENTION

In view of the technical problems in the prior art, one object of the present invention is to provide a more convenient and lower energy-consumption automatic high-temperature treatment equipment, so as to carry out the harmless and recycling treatment of heavy metal contaminated soil in an environmentally friendly way.

In view of the technical problems in the prior art, another object of the present invention is to provide a treatment method, which can reduce the treatment cost of heavy metal contaminated soil, prevent secondary contamination, and realize the harmless and recycling treatment of heavy metal contaminated soil in an environmentally friendly way.

In order to achieve the above objects, the present invention adopts the following technical solution:

A site heavy metal contaminated soil treatment equipment is provided, comprising a sampling system, a molding system, a heat processing system and a tail gas processing system which are disposed in sequence;

the sampling system includes a bucket elevator and a planetary stirring device which are connected in sequence and are both disposed on a mobile platform of the sampling system;

the molding system includes a vacuum extruder, a first conveyor belt and a second conveyor belt, a cutter's station, a first mobile platform and a second mobile platform which are disposed in sequence; a first cutter for cutting brick blanks from the extruder is arranged above the first conveyor belt, and a second cutter for cutting the strip brick blanks into block brick blanks is arranged above the cutter's station, with the second conveyor belt disposed at one side of the cutter's station; the vacuum extruder is located on the first mobile platform, the first conveyor belt and the cutter's station are located on the second mobile platform, and the discharge outlet of the planetary stirring device communicates with the feed inlet of the vacuum extruder;

the heat processing system comprises a drying furnace, a microwave oven, a cooling room, a kiln car track, and a mobile platform of the heat processing system; the kiln car track passes through the drying furnace, the microwave oven and the cooling room in sequence, and connects them in series; the drying furnace, the microwave oven, the cooling room and the kiln car track are all disposed on the mobile platform of the heat processing system, and the drying furnace and the microwave oven are provided with an exhaust gas outlet, respectively;

the tail gas processing system comprises an oxy-fuel combustion apparatus and a spray tower which are both disposed on a mobile platform of the tail gas processing system; the oxy-fuel combustion apparatus comprises a fan, a filter and a combustion chamber connected in sequence, with a catalytic bed installed inside the combustion chamber; the exhaust gas outlets of the drying furnace and the microwave oven communicate with the air inlet of the oxy-fuel combustion apparatus, and the air outlet of the oxy-fuel combustion apparatus communicates with the air inlet of the spray tower.

Further, a first photoelectric sensor, arranged above and at the end of the first conveyor belt in the conveying direction, is used to sense the position of the brick blank extruded from the extruder and send a signal to control the action of the first cutter; a second photoelectric sensor, arranged above and at the end of the cutter's station, is used to sense the position of the brick blank and send a signal to control the action of the second cutter.

Further, the bucket elevator comprises a lifting bucket, a lifting track, and a drive device of the lifting bucket for driving the lifting bucket to move along the lifting track; the planetary stirring device comprises a casing, a cover, a planetary disk and a drive device of the planetary disk, the casing together with the cover forming an accommodating space; the planetary disk, located in the accommodating space, comprises a main shaft, a stirring shovel assembly and a roller assembly; the drive device of the planetary disk drives the planetary disk to rotate around the main shaft connected to the cover, and the stirring shovel assembly and the roller assembly rotate clockwise around the main shaft; the casing is provided with a feed hopper, which is located at one end of the lifting track.

Further, the drying furnace is provided with a first lifting furnace door respectively at the front and rear ends of the kiln car track in the length direction; the furnace body of the drying furnace is of a three-layer thermal insulation structure, which is composed of an alumina fiberboard, an alumina blanket and a metal shell from inside to outside; the drying furnace is provided in the furnace body with a resistance wire of the drying furnace, a thermocouple of the drying furnace and a first ceramic buckle; the drying furnace is provided in front with a first air inlet, and at the bottom with a first lifting bracket, the first ceramic buckle being arranged on the side wall of the drying furnace above the first lifting bracket; the drying furnace is provided at the top with a first exhaust gas outlet; the first exhaust gas outlet and the air inlet of the oxy-fuel combustion apparatus.

Further, the first lifting bracket is provided on the upper surface with a track made of alumina hollow ball material, which will be docked with the kiln car track when the first lifting bracket is located at the bottom, so that the kiln car can move onto the first lifting bracket. When the kiln car moves along the track to the center of the first lifting bracket, the first lifting bracket rises, the first buckle catches the kiln car, and the first lifting bracket descends.

Further, the microwave oven is provided with a second lifting furnace door respectively at the front and rear ends of the kiln car track in the length direction; the oven body of the microwave oven is of a three-layer thermal insulation structure, which is composed of an alumina fiberboard, an alumina blanket and a metal shell from inside to outside; the microwave oven is provided in the oven body with a microwave generator, a thermocouple of the microwave oven, a steam spray pipe and a second ceramic buckle; the microwave oven is provided at the bottom with a second lifting bracket, the second ceramic buckle being arranged on the side wall of the microwave oven above the second lifting bracket; the microwave oven is provided at the top with a second exhaust gas outlet; the second exhaust gas outlet and the air inlet of the oxy-fuel combustion apparatus.

Further, the second lifting bracket is provided on the upper surface with a track made of alumina hollow ball material, which will be docked with the kiln car track when the second lifting bracket is located at the bottom, so that the kiln car can move onto the second lifting bracket. When the kiln car moves along the track to the center of the second lifting bracket, the second lifting bracket rises, the second buckle catches the kiln car, and the second lifting bracket descends.

Further, the cooling room is open at both ends along the length direction of the kiln car track; the cooling room is provided at the top with an induced draft fan, which communicates with the first air inlet of the drying furnace; the cooling room is provided on the side wall with a third ceramic buckle, and on the bottom with a third lifting bracket, the third ceramic buckle being arranged above the third lifting bracket; the third lifting bracket is provided on the upper surface with a track made of alumina hollow ball material, which will be docked with the kiln car track when the third lifting bracket is located at the bottom, so that the kiln car can move onto the third lifting bracket. When the kiln car moves along the track to the center of the third lifting bracket, the third lifting bracket rises, the third buckle catches the kiln car, and the third lifting bracket descends.

The treatment method used by the site heavy metal contaminated soil treatment equipment comprises the following steps: moving, by means of the mobile platform of the sampling system, the first mobile platform, the second mobile platform, the mobile platform of the heat processing system and the mobile platform of the tail gas processing system respectively, the sampling system, the molding system, the heat processing system and the tail gas processing system to the site where a heavy metal contaminated soil treatment is required; then the heavy metal contaminated soil and the coal gangue are added into the sampling system at a mass ratio of 2:1 to 3:1, crushed, stirred and humidified by the planetary stirring device, and conveyed to the molding system for compression molding, blanking and setting; then the brick blanks are transported to the drying furnace by the kiln car along the kiln car track, and dried at 55° C. to 75° C. for 2-3 h; then they are transported to the microwave oven and heated at 900° C. to 1100° C. for 4-5 h; finally, they are transported to the cooling room and cooled to obtain recycled materials; the exhaust gas generated by the drying furnace and the microwave oven, after being introduced into the tail gas processing system, first undergoes aerobic combustion in the oxy-fuel combustion apparatus, and is then filtered and absorbed by the spray tower and discharged when the standard is reached.

Potassium permanganate and lime water are uses as a spray liquid in the spray tower to remove conventional acid gas as well as volatile heavy metals generated during calcination of contaminated soil.

In summary, the present invention has the following advantages:

1. The present invention is easy to move and assemble, has a small floor area, and can be built on a target contaminated site, reducing transportation cost and the risk of secondary contamination; besides, the entire process of the present invention proceeds automatically, reducing labor cost.

2. The present invention establishes a planetary stirring sampling method, and provides an automatic brick blank extrusion molding process, which are applicable to various types of heavy metal contaminated soil with high processing efficiency and good molding effect.

3. The present invention provides a heating method that combines microwave heating and high-temperature steam, which has the advantages of rapid heating, small thermal inertia, and easy temperature control; the microwave ovens, the furnace and so on will not be heated or absorb a lot of heat, which significantly reduces the energy consumption of the equipment.

4. The present invention provides an oxy-fuel combustion apparatus, and improves the tail gas treatment process, which can effectively prevent secondary contamination of volatile heavy metals and organic matter in the high-temperature immobilization process.

The reference characters in FIGS. 1-7 represent the various features of the invention as follows:

1-1. lifting bucket; 1-2. lifting track;

2-1. cover; 2-2. spray pipe; 2-3. feed hopper; 2-4. casing; 2-5. motor; 2-6. stirring shovel assembly; 2-6-1. stirring shovel support; 2-6-2. first stirring shovel group; 2-6-3. second stirring shovel group; 2-6-4. first countershaft; 2-6-5. second countershaft; 2-7. roller assembly; 2-7-1. first roller; 2-7-2. second roller; 2-7-3. first scraper; 2-7-4. second scraper; 2-7-5. roller support; 2-8. discharge screen; 2-9. main shaft;

3-1. vacuum extruder; 3-1-1. stirring chamber; 3-1-2. vacuum chamber; 3-1-3. extrusion chamber; 3-1-4. extruder motor; 3-1-5. stirring shaft; 3-1-6. extrusion shaft; 3-2. first conveyor belt; 3-2-1. first cutter; 3-2-2. first photoelectric sensor; 3-3. cutter's station; 3-3-1. second cutter; 3-3-2. second photoelectric sensor; 3-3-3. push plate; 3-4. first mobile platform; 3-5. second mobile platform; 3-6. second conveyor belt; 3-6-1. robotic arm; 3-7. strip brick blank; 3-8. block brick blank;

4-1. kiln car; 4-2. kiln car track; 4-3. drying furnace; 4-3-1. first lifting furnace door; 4-3-2. resistance wire of drying furnace; 4-3-3. thermocouple of drying furnace; 4-3-4. first ceramic buckle; 4-3-5. first air inlet; 4-3-6. first lifting bracket; 4-3-7. first exhaust gas outlet; 4-4. microwave oven; 4-4-1. second lifting furnace door; 4-4-2. microwave generator; 4-4-3. thermocouple of microwave oven; 4-4-4. steam spray pipe; 4-4-5. second ceramic buckle; 4-4-6. second lifting bracket; 4-4-7. second exhaust gas outlet; 4-5. cooling room; 4-5-1. induced draft fan; 4-5-2. third ceramic buckle; 4-5-3. third lifting bracket; 4-6. mobile platform of heat processing system;

5-1. oxy-fuel combustion apparatus; 5-1-1. fan; 5-1-2. filter; 5-1-3. combustion chamber; 5-2. spray tower; 5-3. mobile platform of tail gas processing system.

DESCRIPTION OF THE INVENTION

The present invention will be further illustrated below in detail.

Example 1

As shown in FIGS. 1 to 7, a site heavy metal contaminated soil treatment equipment is provided, comprising a sampling system, a molding system, a heat processing system and a tail gas processing system which are disposed in sequence. The sampling system includes a bucket elevator and a planetary stirring device which are connected in sequence and are both disposed on a mobile platform of the sampling system. The molding system includes a vacuum extruder 3-1, a first conveyor belt 3-2, a cutter's station 3-3, a first mobile platform 3-4 and a second mobile platform 3-5 which are disposed in sequence; a first cutter 3-2-1 for cutting brick blanks from the extruder is arranged above the first conveyor belt 3-2, and a second cutter 3-3-1 for cutting the strip brick blanks 3-7 into block brick blanks 3-8 is arranged above the cutter's station 3-3; the vacuum extruder 3-1 is located on the first mobile platform 3-4, the first conveyor belt 3-2 and the cutter's station 3-3 are located on the second mobile platform 3-5, and the discharge outlet of the planetary stirring device communicates with the feed inlet of the vacuum extruder 3-1. The heat processing system comprises a drying furnace 4-3, a microwave oven 4-4, a cooling room 4-5, a kiln car track 4-2, and a mobile platform 4-6 of the heat processing system; the kiln car track 4-2 passes through the drying furnace 4-3, the microwave oven 4-4 and the cooling room 4-5 in sequence, and connects them in series; the drying furnace 4-3, the microwave oven 4-4, the cooling room 4-5 and the kiln car track 4-2 are all disposed on the mobile platform of the heat processing system, and the drying furnace 4-3 and the microwave oven 4-4 are provided with an exhaust gas outlet, respectively. The tail gas processing system comprises an oxy-fuel combustion apparatus 5-1 and a spray tower 5-2 which are both disposed on a mobile platform 5-3 of the tail gas processing system; the oxy-fuel combustion apparatus 5-1 comprises a fan 5-1-1, a filter 5-1-2 and a combustion chamber 5-1-3 connected in sequence, with a catalytic bed installed inside the combustion chamber 5-1-3; the exhaust gas outlets of the drying furnace 4-3 and the microwave oven 4-4 communicate with the air inlet of the oxy-fuel combustion apparatus 5-1, and the air outlet of the oxy-fuel combustion apparatus 5-1 communicates with the air inlet of the spray tower 5-2. The oxy-fuel combustion apparatus 5-1 is of a three-layer thermal insulation structure, which is composed of an alumina fiberboard, an alumina blanket and a metal shell from inside to outside. The tail gas pipe communicating with the exhaust gas outlets of the drying furnace 4-3 and the microwave oven 4-4 and a combustion supporting air pipe are connected to the fan 5-1-1, which is connected to the filter 5-1-2, which is connected to the combustion chamber 5-1-3. The combustion chamber 5-1-3 is provided in the middle with a catalytic bed, and at the top with an air outlet connected to the spray tower 5-2.

Figure 4:
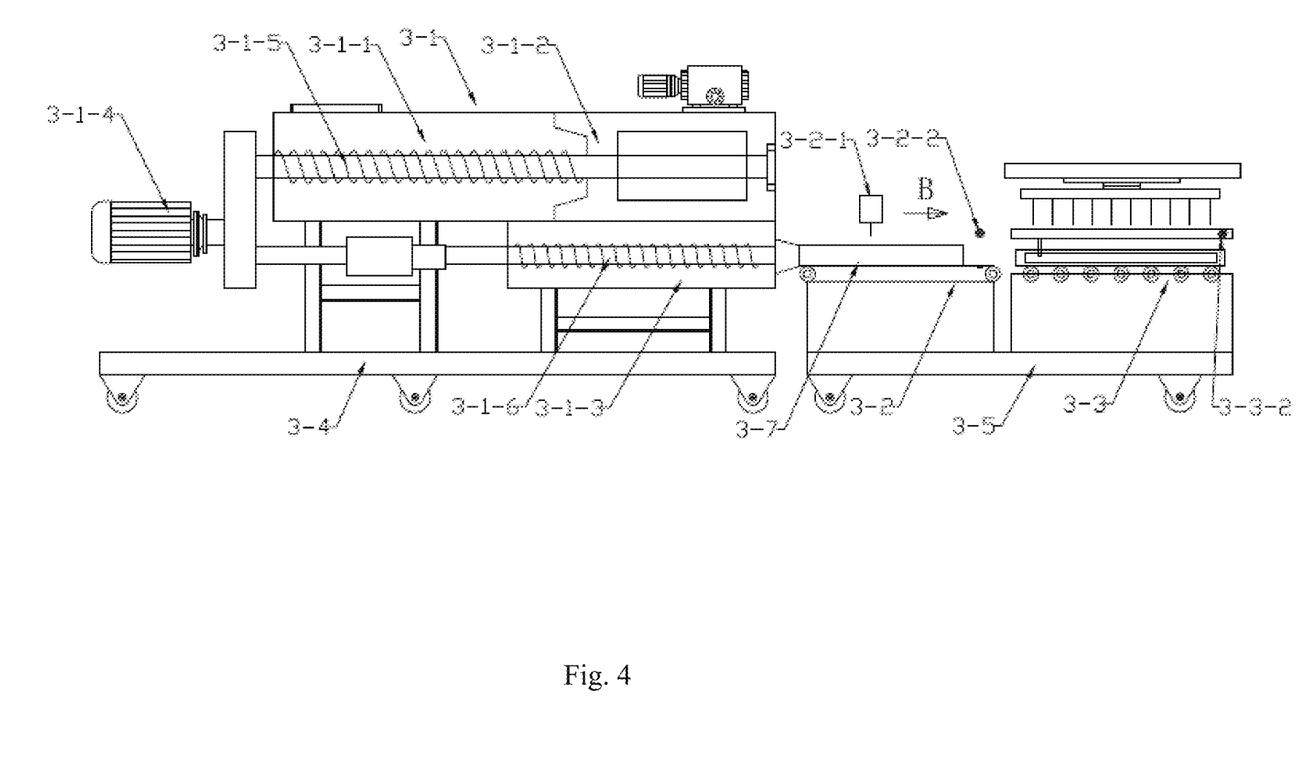
FIG. 4 is a schematic diagram of the structure of the molding system of the site heavy metal contaminated soil treatment equipment of the present invention.

As shown in FIG. 4, a first photoelectric sensor 3-2-2, arranged above and at the end of the first conveyor belt 3-2 in the conveying direction, is used to sense the position of the brick blank extruded from the extruder and send a signal to control the action of the first cutter 3-2-1; a second photoelectric sensor 3-3-2, arranged above and at the end of the cutter's station 3-3, is used to sense the position of the brick blank and send a signal to control the action of the second cutter 3-3-1. The cutter's station 3-3 is provided at one side with a second conveyor belt 3-6, and at the other side with a push plate 3-3-3; the movement direction of the second conveyor belt 3-6 and the push plate 3-3-3 is perpendicular to the first conveyor belt 3-2, with the second conveyor belt 3-6 located on the second mobile platform 3-5. The second conveyor belt 3-6 is provided above with a robotic arm 3-6-1 for moving brick blanks. The first mobile platform 3-4 and the second mobile platform 3-5 are respectively provided with a locking device. The vacuum extruder 3-1 comprises a stirring chamber 3-1-1, a vacuum chamber 3-1-2, an extrusion chamber 3-1-3, and a drive device; the stirring chamber 3-1-1 communicates with the vacuum chamber 3-1-2, which communicates with the extrusion chamber 3-1-3; the stirring chamber 3-1-1 is provided inside with a stirring shaft 3-1-5, the extrusion chamber 3-1-3 is provided with an extrusion shaft 3-1-6, and the extruder motor 3-1-4 drives the stirring shaft 3-1-5 and the extrusion shaft 3-1-6 to rotate.

Figure 1:
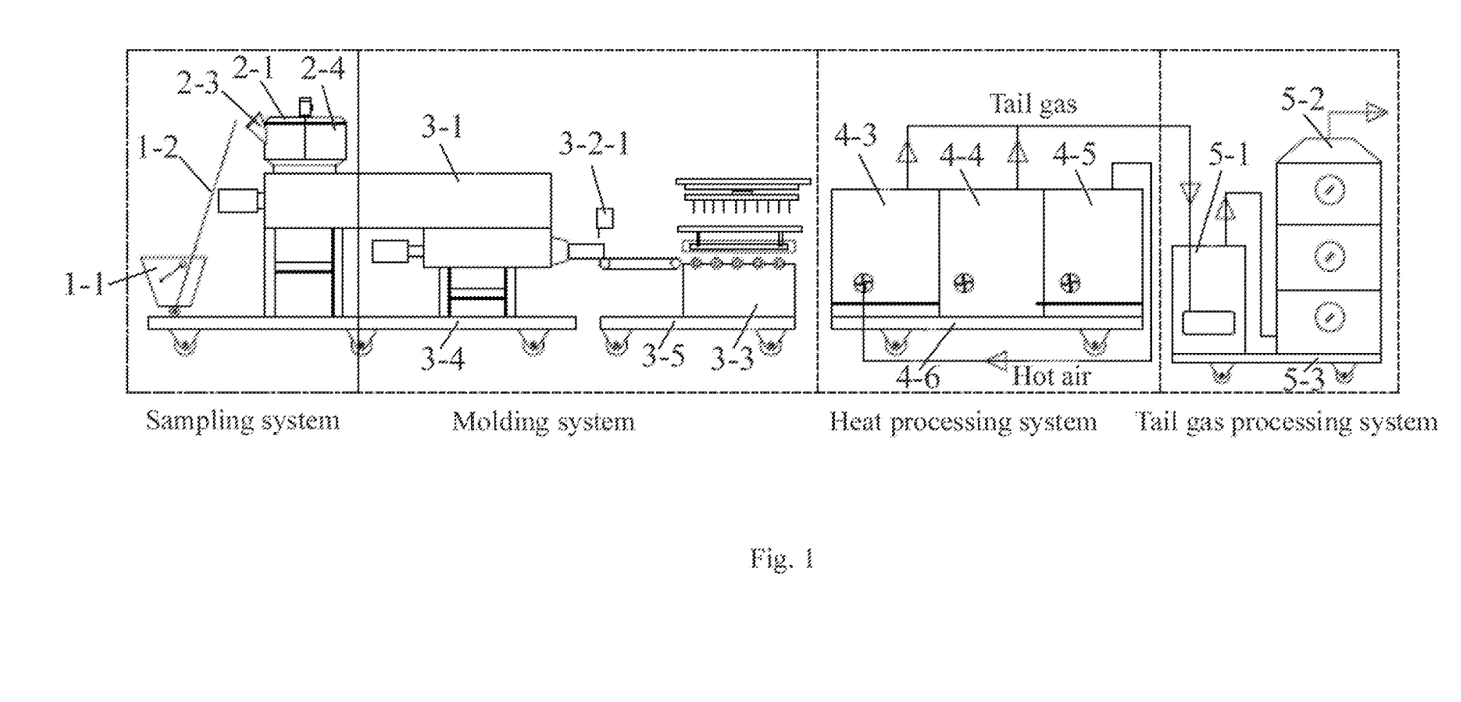
FIG. 1 is a schematic diagram of the overall structure of the site heavy metal contaminated soil treatment equipment of the present invention.
Figure 2:
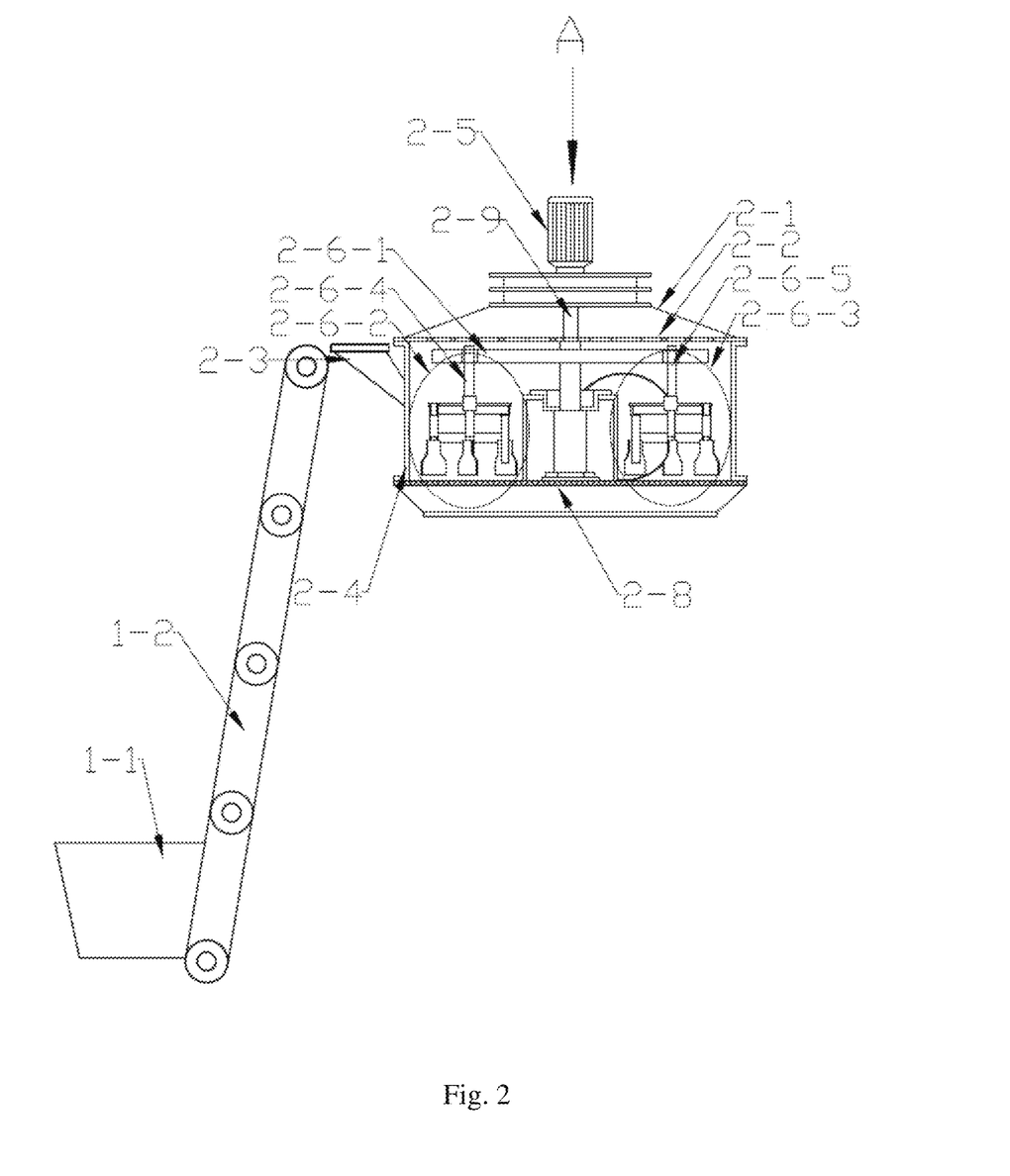
FIG. 2 is a schematic diagram of the structure of the sampling system of the site heavy metal contaminated soil treatment equipment of the present invention.
Figure 3:
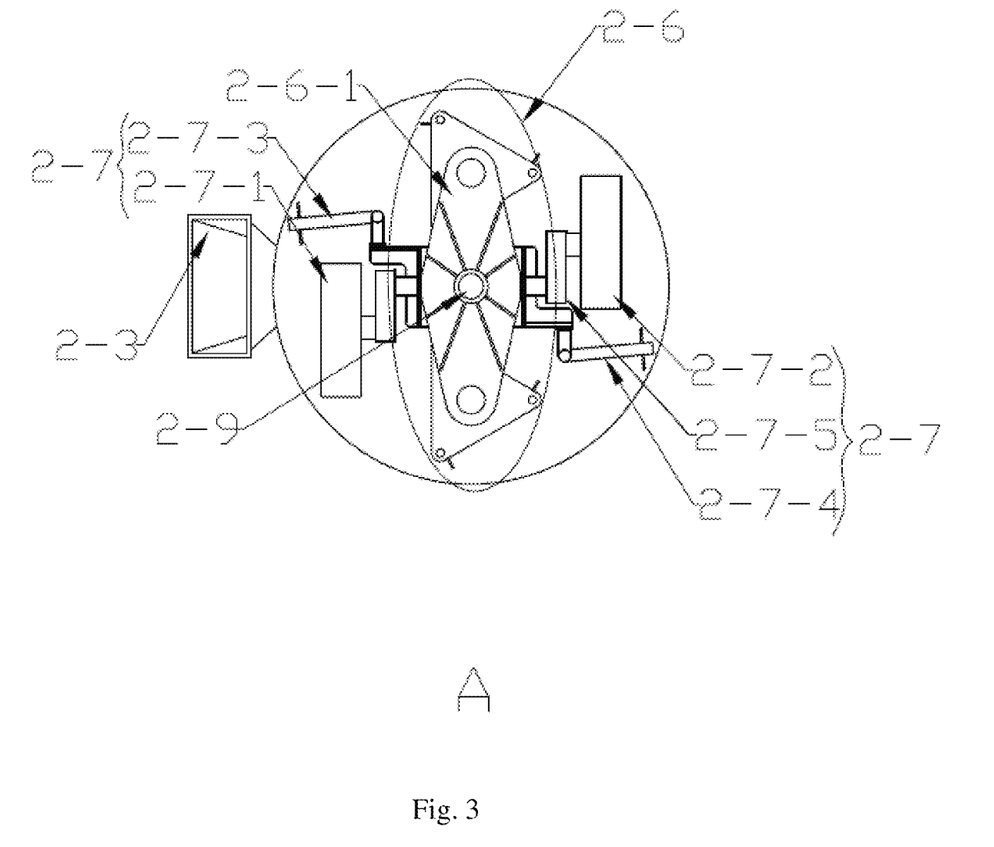
FIG. 3 is a schematic diagram of the structure in FIG. 2 in the direction A.

As shown in FIGS. 2 and 3, the bucket elevator comprises a lifting bucket 1-1, a lifting track 1-2, and a drive device of the lifting bucket 1-1 for driving the lifting bucket 1-1 to move along the lifting track 1-2; the planetary stirring device comprises a casing 2-4, a cover 2-1, a planetary disk and a drive device of the planetary disk, the casing 2-4 together with the cover 2-1 forming an accommodating space; the planetary disk, located in the accommodating space, comprises a main shaft 2-9, a stirring shovel assembly 2-6 and a roller assembly 2-7; the drive device of the planetary disk drives the planetary disk to rotate around the main shaft 2-9 connected to the cover 2-1, and the stirring shovel assembly 2-6 and the roller assembly 2-7 rotate clockwise around the main shaft 2-9; the casing 2-4 is provided with a feed hopper 2-3, which is located at one end of the lifting track 1-2. The stirring shovel assembly 2-6 comprises a stirring shovel support 2-6-1, a first stirring shovel group 2-6-2 and a second stirring shovel group 2-6-3; the stirring shovel support 2-6-1 is rotatably connected to the cover 2-1 through the main shaft 2-9, and the first stirring shovel group 2-6-2 and the second stirring shovel group 2-6-3 are respectively rotatably connected to both ends of the stirring shovel support 2-6-1. The first stirring shovel group 2-6-2 comprises a first countershaft 2-6-4, and three stirring shovels arranged in an equilateral triangle and rotating counterclockwise around the first countershaft 2-6-4; the second stirring shovel group 2-6-3 comprises a second countershaft 2-6-5, and three stirring shovels arranged in an equilateral triangle and rotating counterclockwise around the second countershaft 2-6-5. The roller assembly 2-7 comprises a roller support 2-7-5 rotatably connected to the cover 2-1 through the main shaft 2-9, and a first roller 2-7-1 and a second roller 2-7-2 respectively rotatably connected to both ends of the roller support 2-7-5. The roller support 2-7-5 is provided with a first scraper 2-7-3 and a second scraper 2-7-4 that are close to the inner wall of the casing 2-4, a first scraper 2-7-3 being close to the first roller 2-7-1, the second scraper 2-7-4 being close to the second roller 2-7-2. The casing 2-4 is provided at the bottom with a discharge screen 2-8. The drive device of the planetary disk is a motor 2-5, which is arranged above the cover 2-1. The planetary disk is provided above with a spray pipe 2-2, which is disposed inside the cover 2-1 along the circumference thereof and provided with several water outlets at equal intervals.

Figure 6:
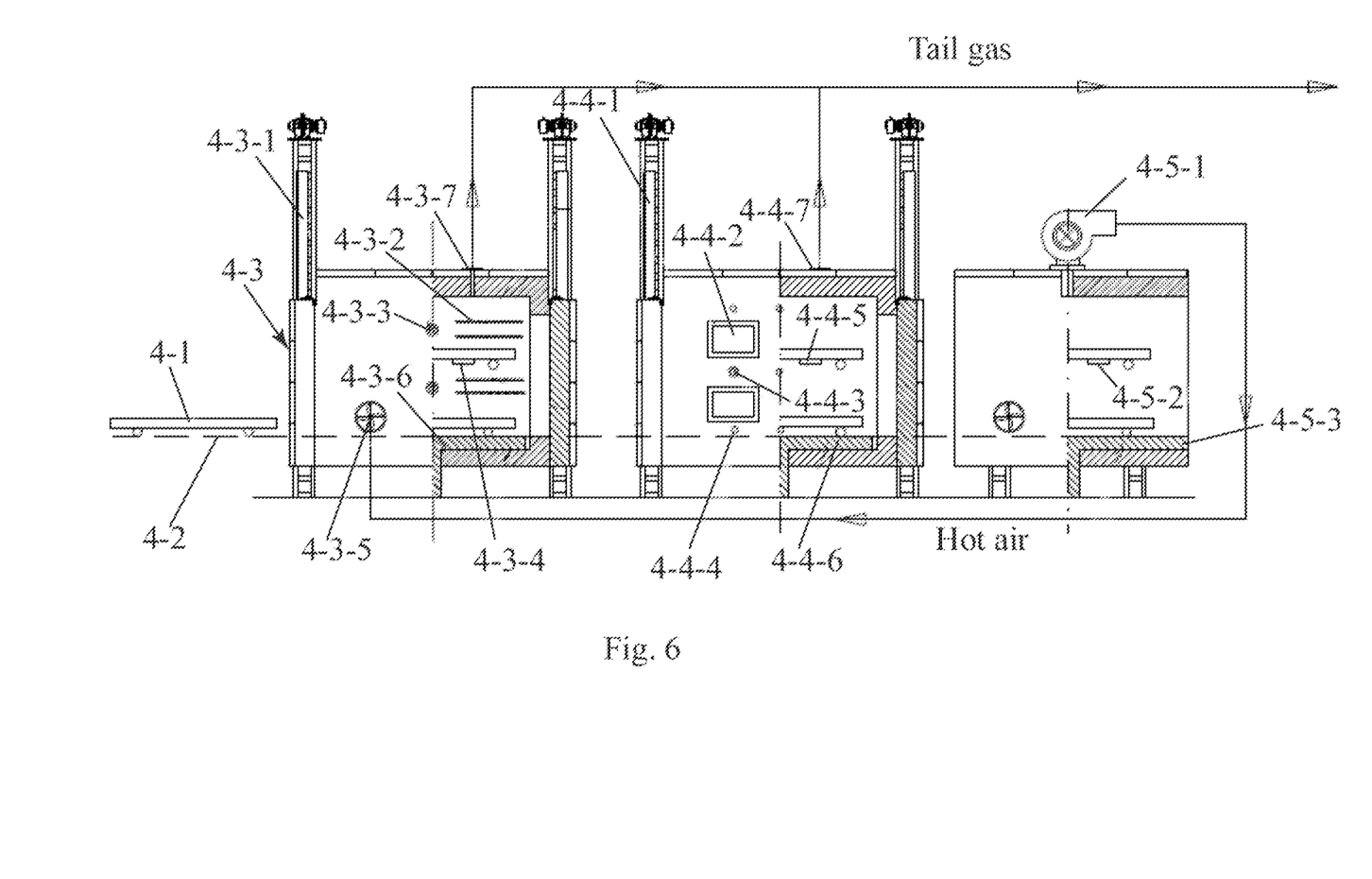
FIG. 6 is a schematic diagram of the structure of the heat processing system of the site heavy metal contaminated soil treatment equipment of the present invention.

As shown in FIG. 6, the drying furnace 4-3 is provided with a first lifting furnace door 4-3-1 respectively at the front and rear ends of the kiln car track 4-2 in the length direction; the furnace body of the drying furnace 4-3 is of a three-layer thermal insulation structure, which is composed of an alumina fiberboard, an alumina blanket and a metal shell from inside to outside; the drying furnace 4-3 is provided in the furnace body with a resistance wire 4-3-2 of the drying furnace, a thermocouple 4-3-3 of the drying furnace and a first ceramic buckle 4-3-4; the drying furnace 4-3 is provided in front with a first air inlet 4-3-5, and at the bottom with a first lifting bracket 4-3-6, the first ceramic buckle 4-3-4 being arranged on the side wall of the drying furnace 4-3 above the first lifting bracket 4-3-6; the drying furnace is provided at the top with a first exhaust gas outlet 4-3-7; the first exhaust gas outlet 4-3-7 and the air inlet of the oxy-fuel combustion apparatus 5-1. The first lifting bracket 4-3-6 is provided on the upper surface with a track made of alumina hollow ball material, which will be docked with the kiln car track 4-2 when the first lifting bracket 4-3-6 is located at the bottom, so that the kiln car 4-1 can move onto the first lifting bracket 4-3-6. The microwave oven 4-4 is provided with a second lifting furnace door 4-4-1 respectively at the front and rear ends of the kiln car track 4-2 in the length direction; the oven body of the microwave oven 4-4 is of a three-layer thermal insulation structure, which is composed of an alumina fiberboard, an alumina blanket and a metal shell from inside to outside; the microwave oven 4-4 is provided in the oven body with a microwave generator 4-4-2, a thermocouple 4-4-3 of the microwave oven, a steam spray pipe 4-4-4 and a second ceramic buckle 4-4-5; the microwave oven 4-4 is provided at the bottom with a second lifting bracket 4-4-6, the second ceramic buckle 4-4-5 being arranged on the side wall of the microwave oven 4-4 above the second lifting bracket 4-4-6; the microwave oven 4-4 is provided at the top with a second exhaust gas outlet 4-4-7; the second exhaust gas outlet 4-4-7 and the air inlet of the oxy-fuel combustion apparatus 5-1. The second lifting bracket 4-4-6 is provided on the upper surface with a track made of alumina hollow ball material, which will be docked with the kiln car track 4-2 when the second lifting bracket 4-4-6 is located at the bottom, so that the kiln car 4-1 can move onto the second lifting bracket 4-4-6. The cooling room 4-5 is open at both ends along the length direction of the kiln car track 4-2; the cooling room 4-5 is provided at the top with an induced draft fan 4-5-1, which communicates with the first air inlet 4-3-5 of the drying furnace 4-3; the cooling room 4-5 is provided on the side wall with a third ceramic buckle 4-5-2, and on the bottom with a third lifting bracket 4-5-3, the third ceramic buckle 4-5-2 being arranged above the third lifting bracket 4-5-3; the third lifting bracket 4-5-3 is provided on the upper surface with a track made of alumina hollow ball material, which will be docked with the kiln car track 4-2 when the third lifting bracket 4-5-3 is located at the bottom, so that the kiln car 4-1 can move onto the third lifting bracket 4-5-3.

The specific working process of the site heavy metal contaminated soil treatment equipment of the present invention is as follows:

1. The bucket elevator is used to transport the heavy metal contaminated soil with a certain proportion of coal gangue as raw materials to the planetary stirring device.

2. The motor 2-5 drives the planetary disk to rotate around the main shaft 2-9, driving the roller assembly 2-7 and the stirring shovel assembly 2-6 to crush and stir the raw materials, with the first scraper 2-7-3 and the second scraper 2-7-4 removing the materials adhered to the inner wall of the casing 2-4 to the middle; the spray pipe 2-2 regulates the humidity of the raw materials by controlling the spray amount, and the stirred raw materials enter the vacuum extrusion device through the discharge screen 2-8.

3. The raw materials enter the vacuum extruder 3-1; after being further stirred in the stirring chamber 3-1-1, the raw materials enter the vacuum chamber 3-1-2 to discharge the air therein, and finally enter the extrusion chamber 3-1-3 to get compressed into compact strip brick blanks 3-7.

Figure 5:
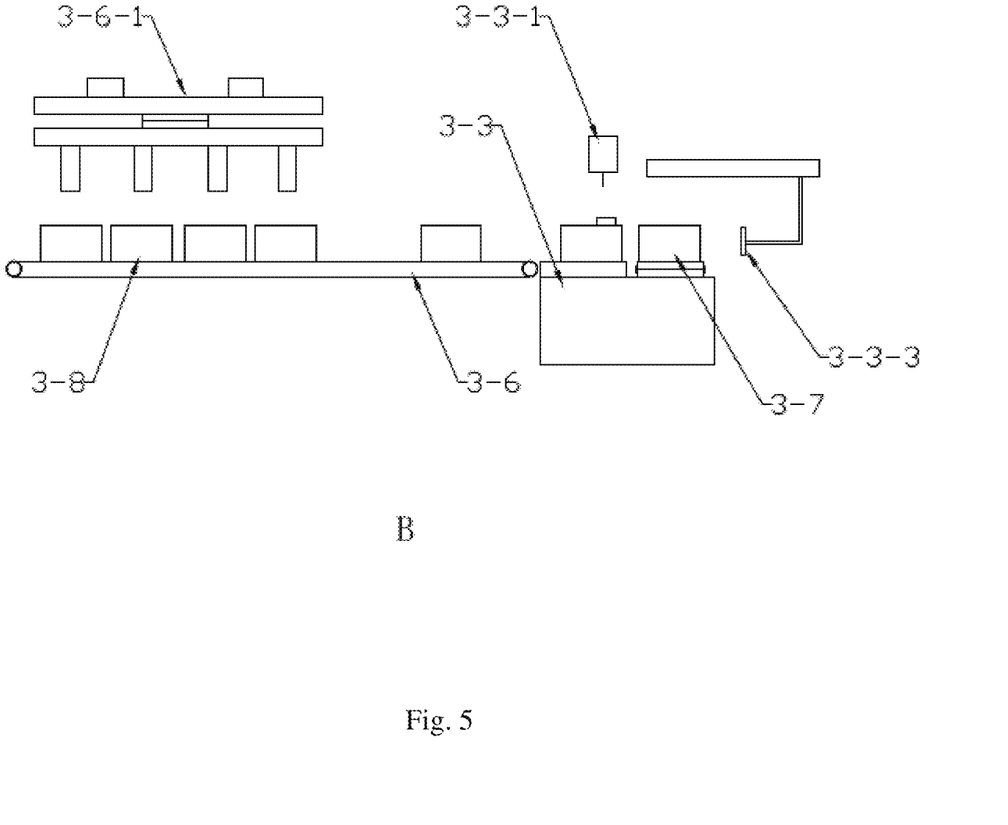
FIG. 5 is a schematic diagram of the structure in FIG. 4 in the direction B.

4. When the extruded strip brick blanks 3-7 reach the set length, the first photoelectric sensor 3-2-2 is triggered to start the first cutter 3-2-1 to cut the strip brick blanks 3-7, and the first conveyor belt 3-2 will accelerately convey the cut strip brick blanks 3-7 to the cutter's station 3-3; the second photoelectric sensor 3-3-2 is triggered to start the second cutter 3-3-1 to cut the strip brick blanks 3-7 into the block brick blanks 3-8; the push plate 3-3-3 pushes the block brick blanks 3-8 onto the second conveyor belt 3-6, and meanwhile the robotic arm 3-6-1 is activated to transfer the block brick blanks 3-8 to the kiln car 4-1.

5. The kiln car 4-1 moves forward along the kiln car track 4-2, and the first lifting furnace door 4-3-1 is raised; when the kiln car 4-1 moves to the middle of the drying furnace 4-3, the first lifting bracket 4-3-6 is raised, thereby pushing the kiln car 4-1 to the set height, and then the first ceramic buckle 4-3-4 is started to fix the kiln car 4-1; the resistance wire 4-3-2 of the drying furnace heats the furnace to a temperature between 55° C. and 75° C. and keeps the temperature for 2-3 h, with the temperature of the furnace measured by the thermocouple 4-3-3 of the drying furnace.

6. The kiln car 4-1 transfers the dried brick blanks to the microwave oven 4-4, and then the microwave generator 4-4-2 is started to heat the microwave oven to a temperature between 900° C. and 1100° C. and keeps the temperature for 4-5 h, with the temperature of the oven measured by the thermocouple 4-3-3 of the microwave oven. The steam spray pipe 4-4-4 sprays high-temperature steam into the oven every 0.5-1 h.

7. The kiln car 4-1 transfers the calcined brick blanks to the cooling room 4-5; the induced draft fan 4-5-1 is started to introduce hot air into the drying furnace 4-3 for supplement the hot air therein; the brick blanks are cooled to obtain the final products.

Figure 7:
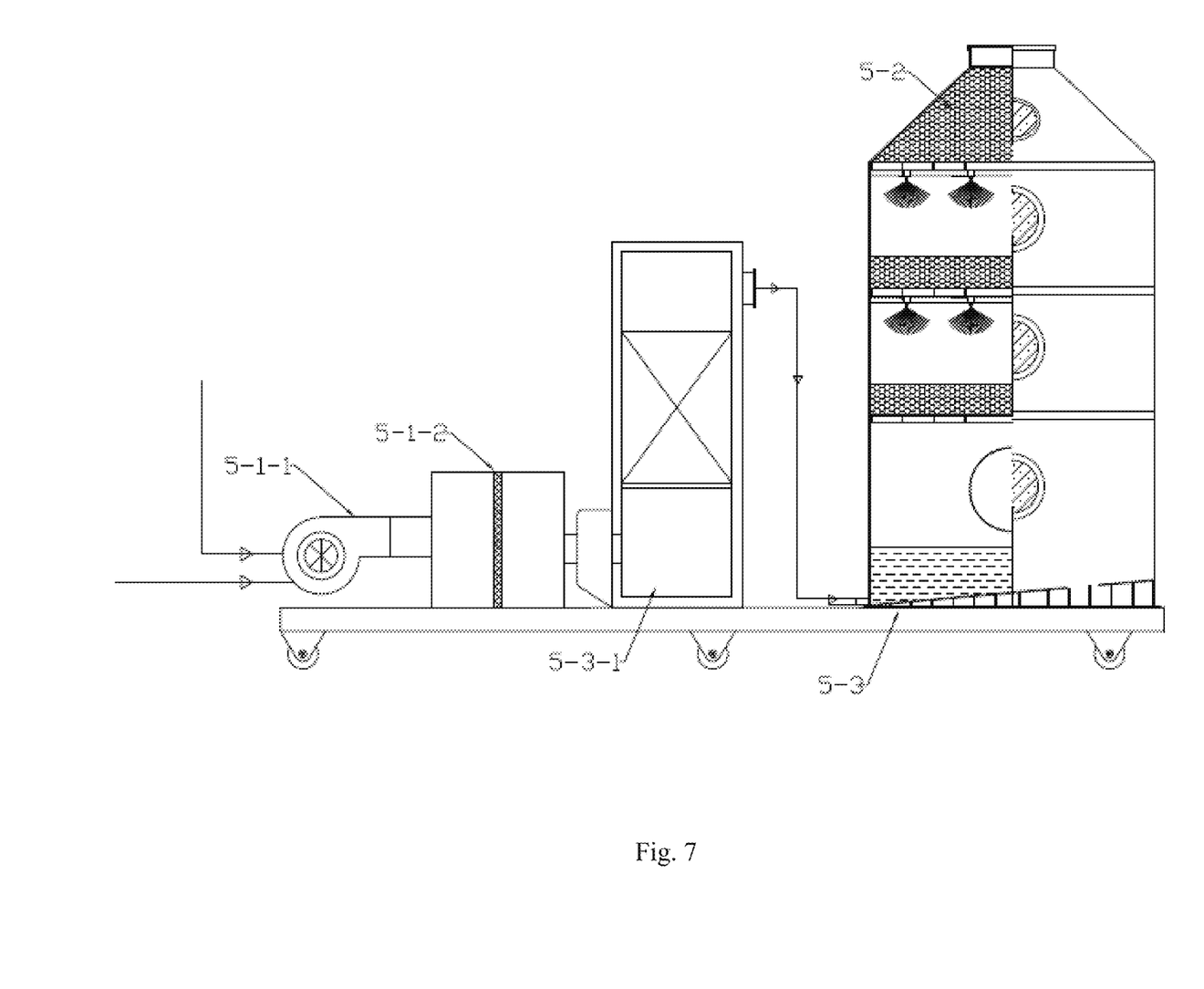
FIG. 7 is a schematic diagram of the tail gas processing system of the site heavy metal contaminated soil treatment equipment of the present invention.

8. The fan 5-1-1 introduces the exhaust gas generated in the drying and calcining process into the tail gas pipe; after being mixed, the tail gas and combustion supporting air enter the filter 5-1-2 to remove dust, then enter the combustion chamber 5-1-3 for aerobic combustion to remove organic waste gas and oxidize volatile heavy metals, and then enter the spray tower 5-2 via the air inlet thereof.

9. The spray tower 5-2 removes acid gas, malodorous gas and oxidized volatile heavy metals in the tail gas, and the tail gas is discharged via the air outlet of the spray tower 5-2 after the standard is reached. Because metallic mercury is volatile with a low the melting point, and is difficult to solidify in the brick blanks, this application is not applicable to soil contaminated by metallic mercury.

Example 2

The treatment method used by the site heavy metal contaminated soil treatment equipment comprises the following steps: moving, by means of the mobile platform of the sampling system, the first mobile platform 3-4, the second mobile platform 3-5, the mobile platform 4-6 of the heat processing system and the mobile platform 5-3 of the tail gas processing system respectively, the sampling system, the molding system, the heat processing system and the tail gas processing system to the site where a heavy metal contaminated soil treatment is required; then the heavy metal contaminated soil and the coal gangue are added into the sampling system at a mass ratio of 2:1 to 3:1, crushed, stirred and humidified by the planetary stirring device, and conveyed to the molding system for compression molding, blanking and setting; then the brick blanks are transported to the drying furnace 4-3 by the kiln car 4-1 along the kiln car track 4-2, and dried at 55° C. to 75° C. for 2-3 h; then the brick blanks are transported to the microwave oven 4-4 and heated at 900° C. to 1100° C. for 4-5 h; finally, they are transported to the cooling room 4-5 and cooled to obtain recycled materials; the exhaust gas generated by the drying furnace 4-3 and the microwave oven 4-4, after being introduced into the tail gas processing system, first undergoes aerobic combustion in the oxy-fuel combustion apparatus 5-1, and is then filtered and absorbed by the spray tower 5-2 and discharged when the standard is reached. Potassium permanganate and lime water are uses as a spray liquid in the spray tower 5-2 to remove conventional acid gas as well as volatile heavy metals such as arsenic generated during calcination of contaminated soil.

1. The remediation of the site heavy metal contaminated soil in Zhuzhou, Hunan Province was taken as an example. The main pollutants in the soil were Pb, Cd, Zn and As, whose maximum concentrations were 12700 mg/kg, 1380 mg/kg, 30700 mg/kg and 2470 mg/kg, respectively. The heavy metal contaminated soil and coal gangue were mixed at a ratio of 2:1 as raw materials.

2. The raw materials were made into brick blanks according to the treatment method used by the site heavy metal contaminated soil treatment equipment.

3. The brick blanks were transported by the kiln car 4-1 to the drying furnace 4-3, and dried therein at 55° C., 65° C. and 75° C. for 2 h and 3 h, respectively; then they were heated in the microwave oven 4-4 at 900° C., 1000° C. and 1100° C. for 4 h and 5 h, respectively.

4. The kiln car 4-1 transported the brick blanks to the cooling room 4-5 for cooling, and the induced draft fan 4-5-1 at the top introduced hot air into the drying furnace 4-3.

5. The waste gas produced in the drying furnace 4-3 and the microwave oven 4-4 entered the tail gas processing system. It first passed through the oxy-fuel combustion apparatus 5-1 to remove the organic gas in the tail gas, and then passed through the spray tower 5-2. Potassium permanganate and lime water were selected as the spray liquid to remove the conventional acid gas and volatile heavy metals, with the absorption rate reaching more than 99%.

6. According to HJ/T299-2007 Solid Waste—Extraction Procedure for Leaching Toxicity, the sintered samples were subjected to a leaching experiment. The leaching solution was a mixture of concentrated sulfuric acid and concentrated nitric acid with a mass ratio of 2:1 and a pH of 3.2. 50 g of the sintered sample was weighed into an extraction bottle, 1.5 L of the leaching solution was added, and then the extraction bottle was placed on an oscillator for leaching for 18 h.

7. According to the experimental results, the dryness of the brick blanks heated at 55° C. to 75° C. for 2-3 h was nearly the same; from the perspective of energy saving, the preferred drying temperature was 55° C. and the drying time was 2 h. In the leaching solution of the original heavy metal contaminated soil sample, the maximum concentrations of Pb, Cd, Zn and As were 3.64 mg/L, 31.82 mg/L, 82.35 mg/L and 180.26 mg/L, respectively. According to the "Standard for Soil Remediation of Heavy Metal Contaminated Sites", the standard limits for soil remediation leaching concentration of heavy metal contaminated sites are as follows: Pb 0.05 mg/L, Cd 0.005 mg/L, Zn 2 mg/L, and As 0.1 mg/L. In the sample leaching solution after sintering, the concentrations of the four heavy metals were all below 0.001 mg/L. The immobilization rate of heavy metals exceeded 99.99%.

Example 3

1. The remediation of the heavy metal contaminated soil at two sites in Zhuzhou, Hunan Province was taken as an example. The main pollutants in the soil of site A were Pb, Cd, Zn and As, whose maximum concentrations in the soil sample leaching solution were 3.64 mg/L, 31.82 mg/L, 82.35 mg/L and 180.26 mg/L, respectively. The main pollutants in the soil of site B were Pb and Zn, whose maximum concentrations in the soil sample leaching solution were 15.62 mg/L and 135.86 mg/L, respectively. The contaminated soils at sites A and B were mixed uniformly at a mass ratio of 1:3, 1:5 and 1:7, respectively.

2. The above mixed soil and coal gangue were mixed respectively at a mass ratio of 2:1 and 3:1 as raw materials.

3. Referring to Example 1 for the brick blank molding process.

4. The brick blanks were transported by the kiln car 4-1 to the drying furnace 4-3, and dried therein at 55° C. for 2 h; then they were calcined in the microwave oven 4-4 at 1100° C. for 5 h.

5. Referring to Example 2 for the tail gas treatment process.

6. According to HJ/T299-2007 Solid Waste—Extraction Procedure for Leaching Toxicity, the sintered samples were subjected to a leaching experiment. Referring to Example 2 for the leaching process.

7. The concentration of heavy metals in the leaching solution of the heavy metal contaminated soil with different ratios had reached the "Standard for Soil Remediation of Heavy Metal Contaminated Sites", which shows that the present invention could remediate the soil contaminated by heavy metals with different ratios, with the heavy metals completely immobilized in the sintered material without leaching out.

The above examples are the preferred embodiments of the present invention. However, the embodiments of the present invention are not limited to the above examples, and any other alterations, modifications, substitutions, combinations and simplifications that are made without departing from the spirit and scope of the present invention should be equivalent replacements and within the scope of protection of the present invention.

The invention claimed is:

1. An on-site heavy metal contaminated soil treatment apparatus comprising a sampling system, a molding system, a heat processing system and a tail gas processing system which are disposed in sequence;
   the sampling system comprises a bucket elevator and a planetary stirring device which are connected in sequence and are both disposed on a mobile platform of the sampling system;
   the molding system comprises a vacuum extruder, a first conveyor belt, a second conveyor belt, a cutter's station, a first mobile platform and a second mobile platform which are disposed in sequence, wherein a first cutter for cutting brick blanks from the vacuum extruder is arranged above the first conveyor belt, and a second cutter for cutting strip brick blanks into block brick blanks is arranged above the cutter's station, the second conveyor belt is disposed at one side of the cutter's station, the vacuum extruder is located on the first mobile platform, the first conveyor belt and the cutter's station are located on the second mobile platform, and a discharge outlet of the planetary stirring device communicates with a feed inlet of the vacuum extruder;
   the heat processing system comprises a drying furnace, a microwave oven, a cooling room, a kiln car track, and a mobile platform of the heat processing system, wherein the kiln car track passes through the drying furnace, the microwave oven and the cooling room in sequence, and connects the drying furnace, the microwave oven and the cooling room in series, the drying furnace, the microwave oven, the cooling room and the kiln car track are all disposed on the mobile platform of the heat processing system, and the drying furnace and the microwave oven are each provided with an exhaust gas outlet;
   the tail gas processing system comprises an oxy-fuel combustion apparatus and a spray tower, wherein the oxy-fuel combustion apparatus and the spray tower are both disposed on a mobile platform of the tail gas processing system, the oxy-fuel combustion apparatus comprises a fan, a filter and a combustion chamber connected in sequence and a catalytic bed installed inside the combustion chamber, the exhaust gas outlets of the drying furnace and the microwave oven communicate with an air inlet of the oxy-fuel combustion apparatus, and an air outlet of the oxy-fuel combustion apparatus communicates with an air inlet of the spray tower.

2. The apparatus according to claim 1, further comprising:
   a first photoelectric sensor, arranged above and at the end of the first conveyor belt in the conveying direction, that senses the position of a brick blank extruded from the vacuum extruder and sends a signal that controls the action of the first cutter; and
   a second photoelectric sensor, arranged above and at the end of the cutter's station, that senses the position of the brick blank and sends a signal that controls the action of the second cutter.

3. The apparatus according to claim 1,
wherein the bucket elevator comprises a lifting bucket, a lifting track, and a drive device of the lifting bucket for moving the lifting bucket along the lifting track; and
the planetary stirring device comprises a casing, a cover, a planetary disk and a drive device of the planetary disk, wherein the casing together with the cover forms an accommodating space, the planetary disk is located in the accommodating space and comprises a main shaft, a stirring shovel assembly and a roller assembly, the drive device of the planetary disk rotates the planetary disk around the main shaft which is connected to the cover, the stirring shovel assembly and the roller assembly rotate clockwise around the main shaft, and the casing is provided with a feed hopper, which is located at one end of the lifting track.

4. The apparatus of claim 1,
wherein the drying furnace is provided with a lifting furnace door at each of a front end and a rear end of the kiln car track in a length direction,
a furnace body of the drying furnace has a three-layer thermal insulation structure comprising an alumina fiberboard, an alumina blanket and a metal shell from inside to outside,
the drying furnace comprises a resistance wire, a thermocouple and a ceramic buckle in the furnace body; an air inlet in a front of the drying furnace; and a lifting bracket in a bottom of the drying furnace, wherein the ceramic buckle is arranged on a side wall of the drying furnace above the lifting bracket;
the exhaust gas outlet of the drying furnace is provided at a top of the drying furnace; and
the exhaust gas outlet of the drying furnace communicates with the air inlet of the oxy-fuel combustion apparatus.

5. The apparatus according to claim 4, wherein the lifting bracket of the drying furnace is provided on an upper surface thereof with a track made of alumina hollow ball material, the track adapted to be docked with the kiln car track when the lifting bracket of the drying furnace is located at the bottom of the drying furnace, so that the kiln car can move onto the lifting bracket of the drying furnace.

6. The apparatus according to claim 1,
wherein the microwave oven is provided with a lifting furnace door at each of a front end and a rear end of the kiln car track in a length direction;
an oven body of the microwave oven has a three-layer thermal insulation structure comprising an alumina fiberboard, an alumina blanket and a metal shell from inside to outside;
the microwave oven comprises a microwave generator, a thermocouple, a steam spray pipe and a ceramic buckle in the oven body; and a lifting bracket at a bottom of the microwave oven, wherein the ceramic buckle is arranged on a side wall of the microwave oven above the lifting bracket;
the exhaust gas outlet of the microwave oven is provided at a top of the microwave oven; and
the exhaust gas outlet of the microwave oven communicates with the air inlet of the oxy-fuel combustion apparatus.

7. The apparatus according to claim 6, wherein the lifting bracket of the microwave oven is provided on an upper surface thereof with a track made of alumina hollow ball material adapted to be docked with the kiln car track when the lifting bracket of the microwave oven is located at the bottom of the microwave oven, so that the kiln car can move onto the lifting bracket of the microwave oven.

8. The apparatus according to claim 1,
wherein the cooling room is open at both ends along a length direction of the kiln car track;
the cooling room comprises an induced draft fan at a top of the cooling room, the induced draft fan communicating with an air inlet of the drying furnace; a ceramic buckle provided on a side wall of the cooling room, and a lifting bracket on a bottom of the cooling room, wherein the ceramic buckle is arranged above the lifting bracket; and
the lifting bracket is provided on an upper surface thereof with a track made of alumina hollow ball material adapted to be docked with the kiln car track when the lifting bracket of the cooling room is located at the bottom of the cooling room, so that the kiln car can move onto the lifting bracket of the cooling room.

9. A treatment method using the on-site heavy metal contaminated soil treatment apparatus according to claim 1 comprising:
moving the sampling system via the mobile platform of the sampling system, the molding system via the first mobile platform and the second mobile platform of the molding system, the heat processing system via the mobile platform of the heat processing system and the tail gas processing system via the mobile platform of the tail gas processing system to a site where heavy metal contaminated soil treatment is required;
adding heavy metal contaminated soil and coal gangue into the sampling system at a mass ratio of 2:1 to 3:1, wherein the heavy metal contaminated soil and coal gangue are crushed, stirred and humidified by the planetary stirring device;
conveying the crushed, stirred and humidified heavy metal contaminated soil and coal gangue to the molding system;
compression molding, blanking, and setting the crushed, stirred and humidified heavy metal contaminated soil and coal gangue in the molding system to form brick blanks;
transporting the brick blanks to the drying furnace via the kiln car along the kiln car track;
drying the brick blanks at 55° C. to 75° C. for 2-3 hours;
transporting the dried brick blanks to the microwave oven and heating the dried brick blanks at 900° C. to 1100° C. for 4-5 hours; and
transporting the heated brick blanks to the cooling room and cooling the heated brick blanks to obtain recycled materials,
wherein exhaust gas generated by the drying furnace and the microwave oven is introduced into the tail gas processing system where the exhaust gas undergoes aerobic combustion in the oxy-fuel combustion apparatus, and is then filtered and absorbed by the spray tower and discharged when a standard is reached.

10. The treatment method according to claim 9, wherein potassium permanganate and lime water are used as a spray liquid in the spray tower to remove conventional acid gas as well as volatile heavy metals generated during calcination of contaminated soil.

* * * * *

UNITED STATES PATENT AND TRADEMARK OFFICE
CERTIFICATE OF CORRECTION

PATENT NO. : 11,358,189 B2
APPLICATION NO. : 17/044388
DATED : June 14, 2022
INVENTOR(S) : Chengshuai Liu et al.

It is certified that error appears in the above-identified patent and that said Letters Patent is hereby corrected as shown below:

On the Title Page

Column 1, item (73), Assignee, Line 3, after "Technology" insert -- , (CN) --

Signed and Sealed this
Twenty-ninth Day of November, 2022

Katherine Kelly Vidal
*Director of the United States Patent and Trademark Office*